May 27, 1958 G. CAMILLI ET AL 2,836,788
INDUCTION APPARATUS
Filed April 19, 1954  2 Sheets-Sheet 1

Inventors
Guglielmo Camilli,
William P. Tootill,
by Gilbert P. Tarleton
Their Attorney.

United States Patent Office 2,836,788
Patented May 27, 1958

2,836,788
INDUCTION APPARATUS

Guglielmo Camilli and William P. Tootill, Pittsfield, Mass., assignors to General Electric Company, a corporation of New York Application April 19, 1954, Serial No. 424,092

5 Claims. (Cl. 323—61)

This invention relates to a cooling system for induction apparatus such as power transformers and reactors, and particularly to a cooling system utilizing blower fans energized from the apparatus current itself.

The output rating of an induction apparatus can be increased by providing it with auxiliary cooling means in the form of fans or blowers. Where there is an auxiliary source of electric energy in the vicinity of the apparatus, the problem of providing the apparatus with fans is very simple of solution since the fans may be connected to the auxiliary source of energy and may be arranged to operate in response to a relay which completes an operating circuit under peak load conditions. However, when an auxiliary source of energy is lacking, as is frequently the case with transformers, the problem of utilizing transformer cooling fans becomes considerably complicated. A current transformer may be used to couple a fan operating circuit directly to the transformer output but since the output varies in accordance with load demands accurate speed regulation is lacking and the fan motor is apt to burn out under peak load conditions.

It is an object of the present invention to provide an induction apparatus cooling system utilizing fans wherein speed regulation of the fans is achieved in a circuit coupled directly to the apparatus current.

It is another object of the present invention to provide in a transformer cooling system a motor driven blower arrangement wherein the blowing increases as the load on the transformer increases up to a limit beyond which the effect of an increased load on the transformer is bypassed around the blower motor.

Figure 1:
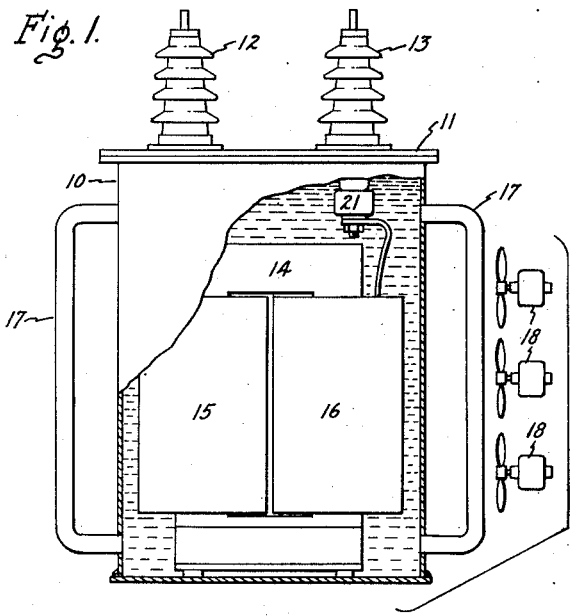
Figure 2:
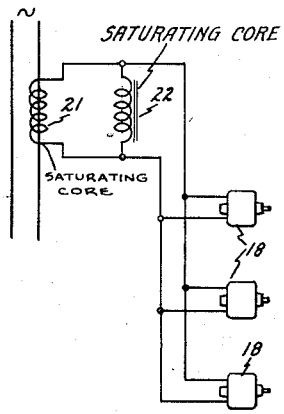
Figure 4:
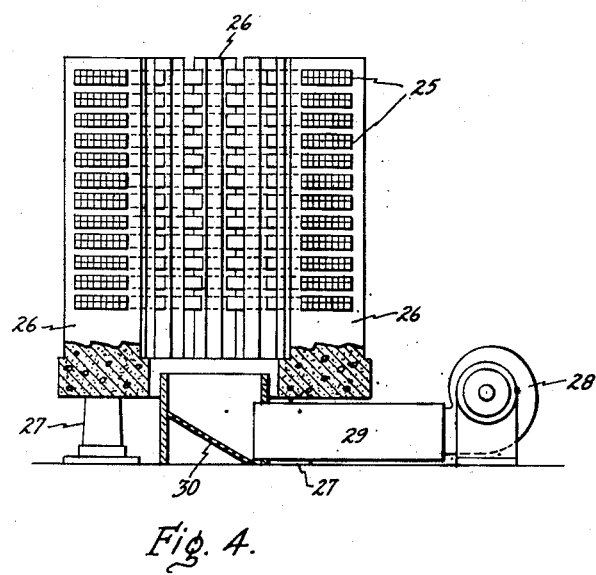
Figure 3:
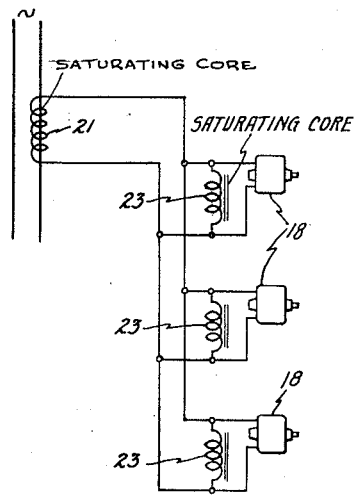
Figure 5:
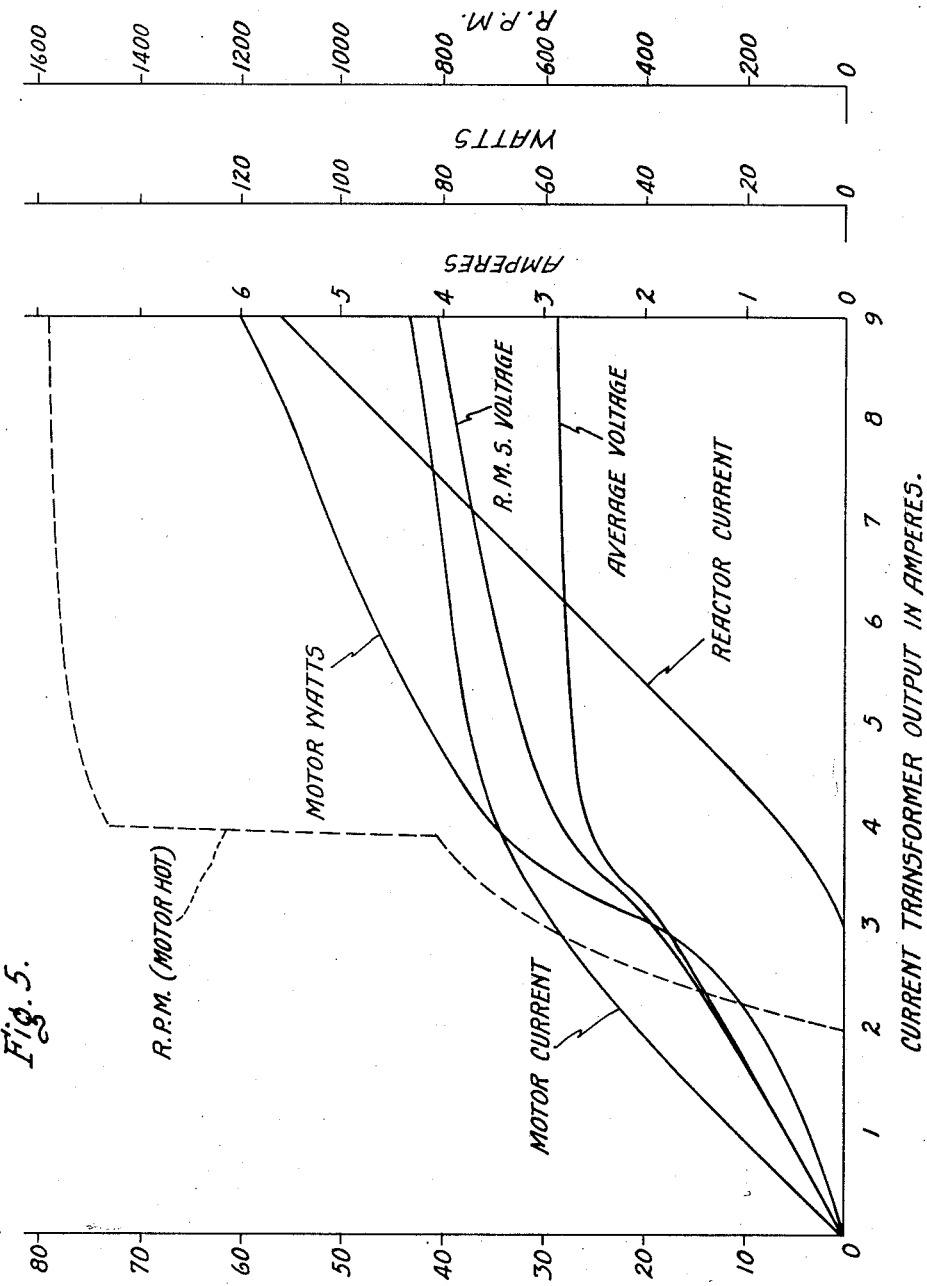

Other objects of the invention will be apparent from the following specification considered in conjunction with the annexed drawing in which Fig. 1 is a schematic sectional elevation of a transformer having a plurality of cooling fans; Fig. 2 is a schematic drawing of one type of operating circuit for the cooling fans of Fig. 1; Fig. 3 is an alternative embodiment of the cooling fan operating circuit; Fig. 4 is a sectional view showing a centrifugal type blower applied to a reactor; and Fig. 5 is a graph illustrating various characteristics of the fan circuit and operation.

Briefly stated, in accordance with one of its aspects, the invention is directed to a power transformer cooling system comprising a current transformer connected in the circuit of the power transformer, at least one electric fan for cooling the power transformer, a circuit connecting the fan to the current transformer, and a saturable core reactor connected in shunt of the fan, the reactor serving to limit the voltage available from the current transformer to operate the fan.

A conventional transformer with auxiliary cooling fans is shown in Fig. 1. A tank 10 with a cover 11 through which is a pair of bushings 12 and 13 extend contains a magnetic core 14 upon which is mounted a pair of windings 15 and 16. The magnetic core 14 and windings 15 and 16 may be immersed in a dielectric liquid such as mineral oil or halogenated aromatic compounds which circulate through exterior cooling passages or radiators 17. The circulation of liquid through the passages 17 may be aided by a pumping system (not shown). The removal of heat from liquid circulating through the passages 17 is facilitated by a series of electric fans 18 which direct air toward the cooling passages 17.

The invention may best be understood with reference to Fig. 2 and Fig. 3. In these figures, a current transformer 21 is connected to the transformer output and the fans 18 are connected in parallel to the current transformer 21. Connected in shunt with all three of the fans 18 of Fig. 2 is a saturable core reactor 22 which serves to limit the voltage passing through the fans 18. In the embodiment of Fig. 3, each of the fans 18 is provided with its own bypass reactor 23.

Current transformers are series devices while ordinary fan motors are constant potential devices. If the fan motor offers a constant impedance to the current transformer, the voltage across the motor will be proportional to the current of the current transformer. Thus, the speed of the motor will be proportional to the current of the current transformer. This is a desirable feature since the current increases as the load on the transformer increases thereby increasing the cooling effect of the fan or blower as it is most needed. To avoid overheating of the fan motor, however, the voltage across the fan should never exceed the rated voltage of the fan motor and this should hold for any condition of loading of the power transformer or reactor to which the fan is coupled. The saturable reactors 22 and 23 are adjusted to their particular fan systems so that at forced cooled ratings of the transformer or reactor of Fig. 1 no appreciable current will flow through the saturable reactors 22 and 23 and therefore, substantially all of the current delivered by the current transformer 21 will flow through the fans causing them to run at rated speed. When the load on the power transformer decreases, the voltage across the fan motors will decrease also and the fans will reduce their speed. When the load on the power transformer is at about the self-cooled rating, the current delivered by the current transformer 21 will not be sufficient to run the fans and they will stop. We have found that fan motors will not overheat under these conditions.

At overloads, that is, when the rated voltage of the fans is exceeded, the saturable reactors 22 and 23 become saturated and a portion of the current delivered by the current transformer 21 will flow through the saturable reactors. Thus, with the saturable reactors 22 and 23 connected in shunt with the fans, there is a limiting voltage available to the fans which will not be exceeded.

Conventional fans may be used in carrying out the present invention. However, in some installations a change in the internal connection of the fan motors may be desirable depending on the number of fans which a given current transformer must supply. Ordinarily, the rated current of a current transformer is five amperes, while the current of a 110-volt, 12-inch fan motor is approximately 1.1 amperes. If the current transformer must supply only a single 12-inch fan motor, it is desirable that the internal connections of the fan motor be altered so that its rated current is nearly equal to the rated current of the current transformer. In a stock fan motor of the shaded pole type with the poles connected in series the poles may be easily connected in parallel to change the rating of the motor from 110 volts at 1.1 amperes to 29 volts at 4.4 amperes. The new current rating of 4.4 amperes is sufficiently close to the 5-ampere rating of the current transformer to enable the single fan to be operated from the current transformer. If the current transformer must supply four fans, then no changes whatever need to be made in the fan motor.

Both the current transformer 21 and the saturable reactors 22 and 23 are arranged to be saturated to a value of the primary current just above the fan-cooled rating of the power transformer apparatus which is being overloaded. For fans of the rating described above, this may be brought about by the use of a small saturable reactor weighing about two and one-half pounds.

In Fig. 4 there is shown a large reactor comprising a plurality of windings 25 cast in a plurality of radiating concrete columns 26 mounted upon pedestals 27. The reactor is cooled by a centrifugal blower 28 which directs a stream of cooling air through a duct 29 to a baffle 30 which directs the air upon the windings 25. As in the case of the fans 18 the blower 28 must be correlated with the current transformer 21 as to current requirements.

The data from which the curves of Fig. 5 were plotted were obtained from tests using a saturable core 23 having a length of 2 inches, an inside diameter of 1.75 inches, and an outside diameter of 3 inches. This core, which had a weight of 2½ pounds, was wound with 75 turns. From Fig. 5, it may be seen that the saturable reactors 23 start to draw current when the voltage across them is approximately 18 volts.

The fan motors have a normal speed of 1500 R. P. M. From Fig. 5 it may be seen that the motor begins to rotate when the current transformer output current exceeds 2 amperes. A test run at a line current just below two amperes showed a temperature rise of the motor casing of 14° C. and of the winding of 44° C. At a line current of 4 amperes, the motor speed will mount very rapidly almost to its normal rate of 1500 R. P. M. Further increases in the line current increase the motor speed only to a very slight degree. Without the saturable reactor 23 connected in shunt with the fan motor, the voltage across the motor is nearly proportional to the current delivered by the current transformer. The saturable reactor holds this voltage to a level which is almost constant at a line current in excess of 4 amperes.

In the arrangement illustrated in Fig. 3, the removal of one of the motors from the circuit results in an increased current and voltage through the remaining units in operation but this increase is relatively small and is not sufficient to endanger the operating life of the remaining fan motors.

By this invention, we have provided a protected transformer cooling arrangement which automatically responds to the cooling demands of the transformer. When the transformer output is low, the cooling fans do not operate. When the load reaches a certain level, the fans commence rotation and rapidly build up to their rated output as the transformer load continues to mount. Before the load has increased to a point where there would be danger of burnout of the fan motors, the saturable reactors 22 and 23 bypass the excess current and voltage thus preventing any damage to the fan motors from overload.

While the present invention has been described with reference to particular embodiments thereof, it will be understood that numerous modifications may be made by those skilled in the art without actually departing from the invention. Therefore, we aim in the appended claims to cover all such equivalent variations as come within the true spirit and scope of the foregoing disclosure.

What we claim as new and desire to secure by Letters Patent of the United States is:

1. An induction apparatus cooling system comprising a current transformer connected in the circuit of said apparatus, at least one electric motor driven fan for cooling said apparatus, a circuit connecting said fan motor to said current transformer, and a saturable reactor connected in shunt with said fan motor, said reactor and said current transformer being designed to saturate when the current in said apparatus slightly exceeds the fan-cooled rating thereof, said reactor and said current transformer serving to limit the voltage available from said current transformer to operate said fan.

2. A power transformer cooling system comprising a current transformer connected in the circuit of said power transformer, a plurality of electric motor driven fans positioned to blow cooling air at said power transformer, a circuit connecting said fan motors to said current transformer, and a saturable reactor connected in shunt with said fan motor, said reactor and said current transformer being designed to saturate when the current in said transformer slightly exceeds the fan-cooled rating thereof, said reactor and said current transformer serving to limit the voltage available from said current transformer to operate said fans.

3. A power transformer cooling system comprising a current transformer connected in the circuit of said power transformer, a plurality of electric motor driven fans positioned to blow cooling air on said power transformer, a circuit connecting said fan motors to said current transformer, and a separate saturable reactor connected in shunt with each of said fan motors, said reactors and said current transformer being designed to saturate when the current in said transformer slightly exceeds the fan-cooled rating thereof, said reactors and said current transformer serving to limit the voltage available from said current transformer to operate their associated fans.

4. An induction apparatus cooling system comprising a variable current circuit, a current transformer connected in said circuit, at least one electric motor driven fan for blowing cooling air on said induction apparatus, a circuit connecting said fan motor to be energized by said current transformer, and a saturable reactor and said current transformer connected in shunt with said fan, said reactor and said current transformer being designed to saturate when the current in said apparatus slightly exceeds the fan-cooled rating thereof, said reactor and said current transformer serving to limit the voltage available from said current transformer to operate said fan.

5. A transformer cooling system comprising a source of varying current, a current transformer connected to said source, a plurality of electric motor driven fans positioned to blow cooling air on a power transformer, a circuit connecting said fans to said current transformer, and a saturable reactor connected in shunt with said fans, said reactor and said current transformer being designed to saturate when the current in said transformer slightly exceeds the fan-cooled rating thereof, said reactor and said current transformer serving to limit the voltage available from said current transformer to operate said fans.

References Cited in the file of this patent

UNITED STATES PATENTS

| | | |
|---|---|---|
| 390,990 | Shallenberger | Oct. 9, 1888 |
| 853,375 | Randall | May 14, 1907 |
| 1,709,629 | Peters | Apr. 16, 1929 |
| 1,755,060 | Gay | Apr. 15, 1930 |